3,004,205
SIGNAL DEVICE
Max E. Barritt and Norman L. Fuqua, Marion, Ohio, assignors to Whirlpool Corporation, St. Joseph, Mich., a corporation of Delaware
Filed Dec. 23, 1957, Ser. No. 704,607
11 Claims. (Cl. 318—490)

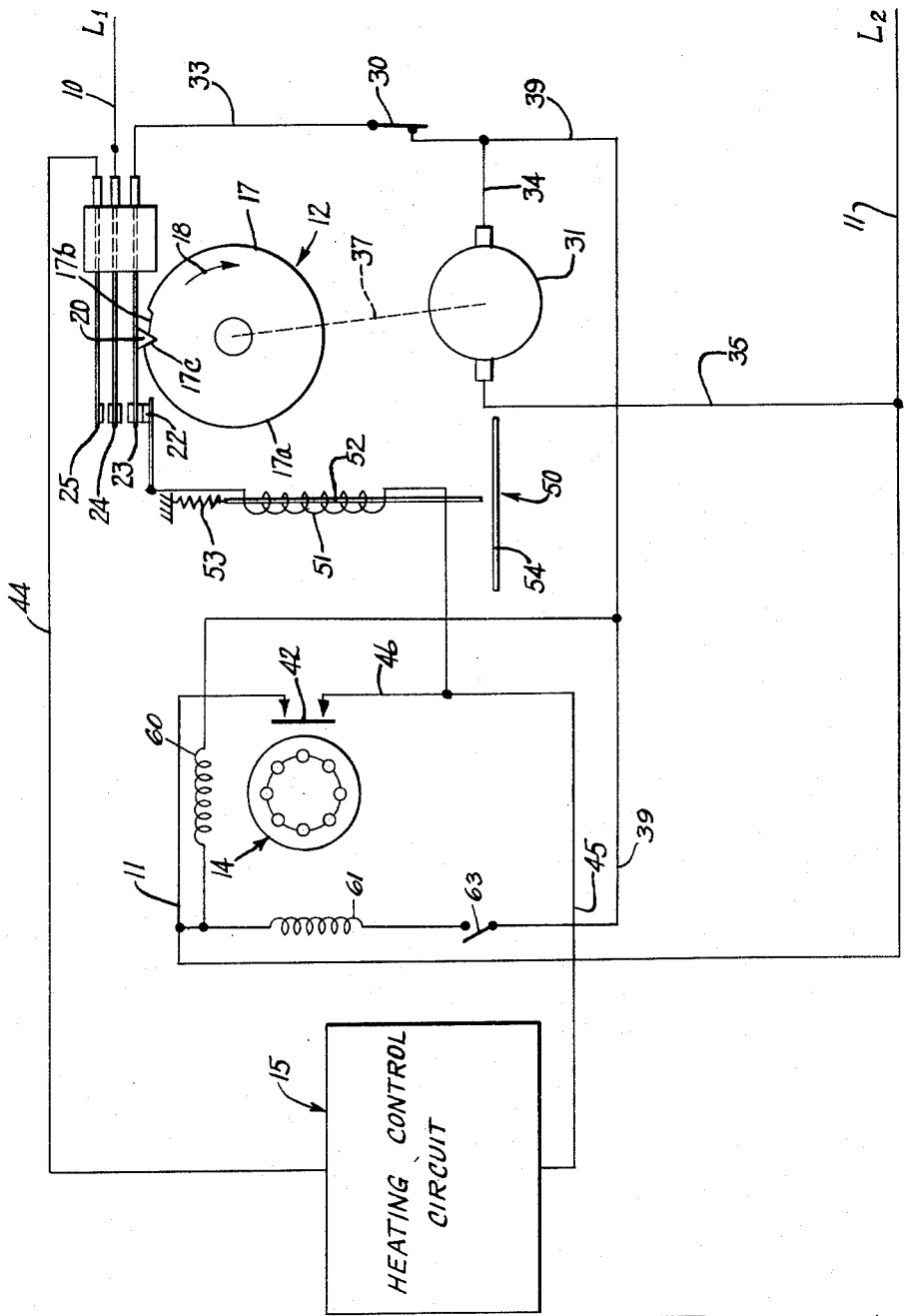

The present invention relates to a signalling device and particularly to a device for giving an audible signal to denote the end of a cycle of a motor driven appliance or the like.

Most audible signalling devices for denoting the end of an appliance cycle heretofore have been of a mechanically actuated type utilizing a centrifugal actuating mechanism. Such mechanisms have two distinct disadvantages: firstly, the device is actuated while the appliance is being started as well as at the end of the appliance cycle giving rise to an extraneous signal; and secondly, the tone from these mechanically actuated devices is not a pleasant sound. Electrically actuated systems have not been used because of the complexity and greater expense of previously known electrical systems.

It is therefore an object of the present invention to provide a simple and economically feasible electrically actuated signalling device and method.

A further object of the invention is to provide a novel method and means for reliably signalling the end of an appliance cycle which will provide a pleasant audible signal only at the desired time in the cycle of the appliance.

Another object of the invention resides in the provision of a signalling device which will not be actuated during starting of an electric motor but which will be actuated when the motor is deenergized during running in order to cause the motor to come to a stop.

A feature of the invention resides in the utilization of the induced E.M.F. of a drive motor which is generated during stopping of the motor to energize an electrical signalling device. In other words, the momentary transient voltage induced in a winding of a motor by the residual decaying circulating rotor currents existing in the rotating rotor of that motor immediately following the deenergization of the motor is utilized to operate an electrical device such as a signaling mechanism.

Other objects, features and advantages of the present invention will be apparent from the following detailed description taken in connection with the accompanying drawings, in which the single figure of the drawings is a diagrammatic illustration of an electric circuit embodying a motor wherein residual decaying currents circulating in the motor rotor induce an electromotive force in the motor winding upon deenergization of the motor to energize an electrically controlled device in accordance with the present invention.

As shown on the drawings:

The figure illustrates the signalling device of the present invention as it might be applied to an automatic clothes dryer for audibly signalling the end of the drying cycle. It will be apparent that the present invention is not limited to this application, but may be used in connection with any motor driven apparatus or the like wherein an E.M.F. is generated upon deenergization of the apparatus.

Referring to the figure in detail, lines 10 and 11 may be connected to any suitable source of electric power, for example a conventional 115 volt 60 cycle household supply. The lines 10 and 11 are connected under the control of a suitable timer mechanism 12 with a dryer motor 14 and with a heating control circuit 15. The dryer motor 14 may be of conventional construction and is, of course, utilized to rotate the clothes receiving drum of the dryer. The heating control circuit 15 may also be of conventional construction and may control either a gas or electric heating mechanism for use in drying the clothes.

When timer control cam 17 is rotated in the direction of the arrow 18, follower 20 is raised to ride on surface 17a of cam 17 opening contacts 22 and 23 and closing contacts 23, 24 and 25. When the door to the dryer is closed, contact 30 will be in the position shown to supply line voltage to timer motor 31 and dryer motor 14. The circuit for the timer motor 31 extends from line 10 through contacts 24 and 23 to line 33, contact 30, line 34, timer motor 31, line 35 and supply line 11. The timer motor 31 now begins to drive the timer control cam 17 in the direction of the arrow 18 by virtue of a mechanical coupling indicated diagrammatically at 37. The energizing circuit for the dryer motor 14 extends from supply line 10 through contacts 24 and 23, line 33, contact 30, line 39, and dryer motor 14 to supply line 11. When dryer motor 14 accelerates to a predetermined speed that is below its normal operating speed, centrifugal motor switch 42 closes to energize the heating control circuit 15 through the following circuit: supply line 10, contacts 24 and 25, line 44, heating control circuit 15, line 45, line 46, centrifugal motor switch 42, and supply line 11. Toward the end of the drying cycle, the timer control cam 17 reaches an angular position such that follower 20 rides onto depressed portion 17b of the cam surface causing contacts 24 and 25 to open while contacts 23 and 24 remain closed. At this time heating control circuit 15 is deenergized to interrupt the supply of heat to the dryer. At the end of the drying cycle, follower 20 rides into notch 17c to open contacts 23 and 24 and close contacts 22 and 23. At this time dryer motor 14 is deenergized and begins to decelerate; however, centrifugal switch 42 remains closed for a substantial time period until the motor 14 slows down to the predetermined speed at which switch 42 is opened.

During the time when the dryer motor is deenergized and centrifugal switch 42 remains closed, the induced transient electromotive force of the motor 14, or more specifically, the inertia of the rotor and the decaying circulating currents in the rotor of the motor 14 are utilized to energize a signalling device 50 which may comprise a controlled device such as a bell or chime. The signalling or controlled device may comprise a coil 51 which when energized causes a plunger to move against a tone arm to produce an audible signal. The energization of coil 51 is dependent upon the sequence of events occurring as and after the switch follower 20 drops into the notch 17c. The electrical properties of the coil 51 are matched to the system so as to be properly energized by the induced transient E.M.F.; however, the coil need not be constructed to withstand the 115 volt supply voltage since the induced transient E.M.F. generated is not extremely high and is of very short duration. This allows economical construction of the coil 51. Specifically, the energizing circuit for the coil 51 extends from running winding 60 of the motor 14 through centrifugal switch 42, line 46, coil 51, contacts 22 and 23, line 33, door switch contact 30, and line 39 back to the running winding 60.

The signalling device 50 has been illustrated as comprising a plunger 52 normally retained in an upper position by a spring 53 but actuated by energization of coil 51 to move downwardly and strike a tone arm 54 to provide a single tone signal at the end of the cycle.

By way of specific example, the motor 14 may comprise a ⅓ horsepower, 1725 r.p.m., 115 volt, 60 cycle single phase induction motor having a running winding 60 and a starting winding 61 connected between lies 11 and 39 as indicated in the drawing. A centrifugal switch 63 is connected in series with the starting winding 61 to disconnect the starting winding as the motor approaches normal speed.

When the initial movement of follower 20 causes a separation of the contacts 23 and 24, the running winding 60 of the motor 14 is disconnected from its power source. Immediately after the separation of the contacts 23 and 24, for example, in about two to four microseconds, the magnetic field about the running winding 60 collapses. This collapsing field induces a high but brief electromotive force which is dissipated across the air gap between the contacts 23 and 24. The dissipation of this energy may produce a spark between such contacts. The electromotive force produced by the collapsing field is completely dissipated by the time the contact 23 has separated from the contact 24 and has engaged the contact 22 since it requires more than a two to four microsecond period for the switch follower 20 to complete this latter movement.

However, since only a few microseconds have elapsed since the opening of the running winding 60, diminishing circulating currents still exist in the rotating rotor of the motor 14 when the contacts 22 and 23 engage each other. Therefore, for another few microseconds, for example 20, these circulating currents continue to circulate in the rotor, and in so doing, create a magnetic moment about the rotating rotor which, coupled to the running winding 60, induces an electromotive force in the winding 60. Since the winding 60 is in series with the coil 51, this induced electromotive force in the winding 60 produces a current flow through the coil 51 large enough to cause the armature member 52, illustrated as a chime plunger, to strike the tone arm against the bias of the spring 53.

Summarizing the operation of the system, during the drying cycle, cam surface 17a of timer control 17 maintains follower 20 in upper position to maintain contacts 22 and 23 open and contacts 23 and 24 closed. Motor 14 is then energized and centrifugal switch 42 closed. When timer cam 17 reaches the end of its cycle, notch 17c registers with follower 20 to open contacts 23 and 24, de-energizing motor 14, and contacts 22 and 23 are closed to complete an energizing circuit for signalling device 50 based on the transient voltage generated by the motor 14 at this time.

It will be apparent that many modifications and variations may be effected without departing from the scope of the novel concepts of the present invention.

We claim as our invention:

1. A signalling device comprising means for producing a sensorily discernible signal including electrically operated means, electrical motor means including a rotor and a winding operative to produce an electromotive force constituting a momentary transient voltage induced in the winding by the residual decaying circulating rotor current existing in the rotor when the motor is deenergized and is decelerating from operating speed, and means for connecting said electrically operated means to said winding of said motor means during deceleration of said motor means for energization of said electrically operated means by said electromotive force to produce said signal.

2. A signalling device comprising means for producing an audible signal including a coil, motor means for delivering a mechanical force during running and including a rotor and a winding operative to generate a momentary transient voltage in the winding induced by the residual decaying circulating rotor currents in the decelerating rotor upon deenergization of the motor means, and means for connecting said coil to said winding of said motor means upon deenergization of said motor means to actuate said signal producing means.

3. A signalling device comprising means for producing a signal including a coil, motor means having a rotor for delivering a mechanical force during energization thereof and having a winding in which is generated a transient voltage upon deenergization of said motor means, an energizing circuit for said winding of said motor means, first switch means controlling said energizing circuit, second switch means for connecting said coil to said winding of said motor means, and means for contemporaneously actuating said first and second switch means to connect said coil to said motor means upon deenergization of said motor means, whereupon said coil will respond to said transient voltage.

4. In combination, motor means having a rotor and a running winding for delivering a mechanical force during energization thereof by a given supply voltage, coil means for delivering a mechanical force upon energization by a voltage substantially less than said supply voltage, and means for connecting said coil means in series to said winding of said motor means whereupon said coil means will be responsive to a transient voltage generated in said winding through diminishing circulating currents in said rotor upon deenergization of said motor means and deceleration of the rotor.

5. A control device comprising electrical motor means having a rotor and a running winding operative through the diminishing circulating currents in the decelerating rotor upon deenergization of the motor inducing a transient electromotive force in the running winding and constituting a signal voltage, and an actuating means in series with said running winding and being responsive to said signal voltage.

6. A signalling device comprising means for producing an audible signal including a coil, motor means having a rotor for delivering a mechanical force during running and in which diminishing circulating currents flow upon deceleration following deenergization of the motor, said motor means having a running winding in which is generated a transient voltage induced by said diminishing circulating currents upon deenergization of the motor, and circuit means including switching means connecting said coil in series with said winding of said motor means to actuate said signal producing means in response to said transient voltage.

7. Control mechanism comprising a controlled device, a motor including a winding and a rotor, means for connecting said motor to a source of power to energize said winding and induce circulating currents in said rotor, and means for disconnecting said winding from said source of power and connecting said controlled device in an electrical circuit with said winding to cause residual decaying currents induced in said rotor to induce an electromotive force in said winding and thereby energize said controlled device.

8. The invention set forth in claim 7 in which said winding is a running winding of said motor.

9. The invention set forth in claim 7 in which said motor is an induction motor and said winding is a running winding of said induction motor.

10. Control mechanism comprising a controlled device, a motor including a winding and a rotor, switch means for connecting said motor to a source of power to energize said winding and induce circulating currents in said rotor, and control means for actuating said switch means to disconnect said winding from said source of power and connect said controlled device in an electrical circuit with said winding to cause residual decaying currents induced in said rotor to induce an electromotive force in said winding and thereby energize said controlled device.

11. Control mechanism comprising, a controlled device, an induction motor including a running winding and a rotatable rotor, a first set of engageable electrical contacts for connecting said motor to a source of power to energize said winding and to effect a rotation of said rotor and induce circulating currents in said rotor, a second set of electrical contacts in circuit relationship with said winding and said controlled device, and control means for effecting a separation of said first set of electrical contacts and a closure of said second set of electrical contacts to connect said winding in series with said controlled device to cause residual decaying currents induced in said rotating rotor to induce an electromotive force in said winding and thereby energize said controlled device.

References Cited in the file of this patent

UNITED STATES PATENTS

| | | |
|---|---|---|
| 2,157,160 | Buck | May 9, 1939 |
| 2,278,573 | Spear | Apr. 7, 1942 |
| 2,538,789 | Maynard | Jan. 23, 1951 |